US012625319B2

(12) United States Patent
Yun et al.

(10) Patent No.: US 12,625,319 B2
(45) Date of Patent: May 12, 2026

(54) WAVEGUIDE TRANSITIONS FOR HYBRID THIN-SILICON/III-V PHOTONICS

(71) Applicant: OpenLight Photonics, Inc., Goleta, CA (US)

(72) Inventors: Han Yun, Santa Clara, CA (US); Erik Johan Norberg, Santa Barbara, CA (US); John Parker, Goleta, CA (US)

(73) Assignee: OpenLight Photonics, Inc., Goleta, CA (US)

( * ) Notice: Subject to any disclaimer, the term of this patent is extended or adjusted under 35 U.S.C. 154(b) by 266 days.

(21) Appl. No.: 18/385,119

(22) Filed: Oct. 30, 2023

(65) Prior Publication Data

US 2024/0142700 A1 May 2, 2024

Related U.S. Application Data

(60) Provisional application No. 63/421,644, filed on Nov. 2, 2022.

(51) Int. Cl.
| | |
|---|---|
| *G02B 6/122* | (2006.01) |
| *G02B 6/12* | (2006.01) |
| *G02B 6/136* | (2006.01) |

(52) U.S. Cl.
CPC ........... *G02B 6/1228* (2013.01); *G02B 6/136* (2013.01); *G02B 2006/12061* (2013.01); *G02B 2006/12097* (2013.01)

(58) Field of Classification Search
CPC .......................... G02B 6/12002; G02B 6/1228
See application file for complete search history.

(56) References Cited

U.S. PATENT DOCUMENTS

| | | | |
|---|---|---|---|
| 6,253,009 B1 | 6/2001 | Lestra et al. | |
| 8,891,913 B1 | 11/2014 | Roth et al. | |
| | (Continued) | | |

FOREIGN PATENT DOCUMENTS

| | | |
|---|---|---|
| CN | 110785687 | 1/2022 |
| CN | 113885132 | 5/2022 |
| | (Continued) | |

OTHER PUBLICATIONS

"European Application Serial No. 23220802.5, Extended European Search Report mailed Jun. 7, 2024", 9 pgs.

(Continued)

*Primary Examiner* — Charlie Y Peng
(74) *Attorney, Agent, or Firm* — Schwegman Lundberg & Woessner, P.A.

(57) ABSTRACT

A device comprises a substrate having lower and upper silicon layers separated by a lower dielectric layer and a III-V structure bonded to the substrate, with first, second, and third sections along an optical axis. The first section comprises a first upper waveguide segment of the upper silicon layer, increasing in width from a first width to a second width at an interface between the first and second sections, the III-V structure overlapping with a tapered portion of the first upper waveguide segment. The second section comprises a second upper waveguide segment of the upper silicon layer decreasing in width, and a first lower waveguide segment of the lower silicon layer wider than the second upper waveguide segment at the interface between the second and third sections. The third section comprises a second lower waveguide segment of the lower silicon layer.

20 Claims, 9 Drawing Sheets

(56) References Cited

U.S. PATENT DOCUMENTS

| | | | | |
|---|---|---|---|---|
| 9,431,791 | B1 | 8/2016 | Norberg et al. | |
| 11,163,115 | B1 | 11/2021 | Gehl et al. | |
| 11,409,040 | B1 | 8/2022 | Bian | |
| 11,631,967 | B2 | 4/2023 | Koch et al. | |
| 2013/0315537 | A1 | 11/2013 | Murao et al. | |
| 2018/0138658 | A1 | 5/2018 | Norberg et al. | |
| 2018/0231714 | A1* | 8/2018 | Collins | G02B 6/26 |
| 2019/0369333 | A1* | 12/2019 | Testa | G02B 6/12 |
| 2020/0124791 | A1* | 4/2020 | Bayn | G02B 6/1228 |
| 2022/0013985 | A1 | 1/2022 | Koch et al. | |
| 2023/0104227 | A1* | 4/2023 | Bian | G02B 6/1228 |
| | | | | 385/43 |
| 2023/0314708 | A1* | 10/2023 | Bian | G02B 6/12004 |
| | | | | 385/14 |
| 2024/0061176 | A1* | 2/2024 | Bian | G02B 6/12002 |
| 2024/0219637 | A1 | 7/2024 | Yun et al. | |

FOREIGN PATENT DOCUMENTS

| | | |
|---|---|---|
| CN | 113568106 | 7/2022 |
| CN | 117991446 | 5/2024 |
| CN | 118276231 | 7/2024 |
| EP | 2985645 | 2/2016 |
| EP | 3091381 | 11/2016 |
| JP | 2016042575 A | 3/2016 |
| KR | 102861615 B1 | 9/2025 |
| TW | I705275 | 9/2020 |
| TW | I782350 | 11/2022 |
| TW | 202433105 | 8/2024 |
| TW | 202433108 | 8/2024 |

OTHER PUBLICATIONS

"Taiwanese Application Serial No. 112142235, Office Action mailed Sep. 9, 2024", With English Machine Translation, 17 pgs.

"European Application Serial No. 23207503.6, Response filed Sep. 23, 2024 to Extended European Search Report mailed Mar. 12, 2024", 11 pgs.

"Taiwanese Application Serial No. 112151645, Office Action mailed Oct. 23, 2024", With English Machine Translation, 15 pgs.

"European Application Serial No. 23207503.6, Extended European Search Report mailed Mar. 12, 2024", 8 pgs.

De, Groote A, "Integration of a III-V light emitter on a silicon photonic IC through transfer printing", IEEE 13th International Conference on Group IV Photonics (GFP), IEEE, (Aug. 24, 2016), 2 pgs.

"U.S. Appl. No. 18/545,570, Non Final Office Action mailed Nov. 28, 2025", 9 pgs.

"European Application Serial No. 23207503.6, Communication Pursuant to Article 94(3) EPC mailed May 20, 2025", 6 pgs.

"European Application Serial No. 23207503.6, Response filed Sep. 17, 2025 to Communication Pursuant to Article 94(3) EPC mailed May 20, 2025", w/ English Claims, 12 pgs.

"Korean Application Serial No. 10-2023-0192556, Notice of Preliminary Rejection mailed May 30, 2025", w/ English translation, 7 pgs.

"Taiwanese Application Serial No. 112142235, Response filed Dec. 9, 2024 to Office Action mailed Sep. 9, 2024", w/ English claims, 13 pgs.

"Taiwanese Application Serial No. 112151645, Response filed Jan. 9, 2025 to Office Action mailed Oct. 23, 2024", W/English Claims, 27 pgs.

* cited by examiner

WAVEGUIDE TRANSITIONS FOR HYBRID THIN-SILICON/III-V PHOTONICS

CROSS-REFERENCE TO RELATED APPLICATION

This application claims priority from U.S. Provisional Patent Application Ser. No. 63/421,644, filed Nov. 2, 2022, which is incorporated herein by reference in its entirety.

TECHNICAL FIELD

The present disclosure generally relates to optical devices and more particularly to optical waveguides.

BACKGROUND

Silicon photonics enables low-cost integrated optical circuits. Hybrid silicon/III-V material platforms, moreover, facilitate integrating lasers, among other active devices, into the optical circuits directly on-chip, eliminating the need for light to be coupled into the optical circuits from external light sources, as would result in optical coupling losses and degrade power efficiency. Hybrid silicon/III-V optical circuits generally include waveguide transition structures to couple light between silicon waveguides and III-V waveguides. In wafers with silicon device layer thicknesses of around 500 nm, efficient waveguide transitions can be formed from silicon width tapers along which the mode effective refractive index can vary between values higher and lower than the refractive index of the III-V waveguide. Many foundries, however, use wafers with silicon device layer thicknesses of about 220 nm, which allow for higher-speed silicon optical modulators. Such thin silicon layers result in a refractive index mismatch between the silicon and III-V waveguides that cannot be overcome with conventional silicon tapers. Accordingly, to leverage the benefits of both hybrid silicon/III-V and thin-silicon photonic circuits, new waveguide transition structures are needed.

BRIEF DESCRIPTION OF THE DRAWINGS

Described herein, with reference to the accompanying drawings, are waveguide transitions for thin-silicon/III-V platforms.

DESCRIPTION

As described above, conventional manufacturing techniques may result in an optical refractive index mismatch between silicon waveguides and III-V waveguides that cannot be corrected by adjusting the width of the silicon waveguide. The light mode's effective index in a thin silicon waveguide of 220 nm in thickness is much smaller than in the III-V waveguide. It is challenging to lower the effective index in III-V waveguide to match that in the silicon waveguide, and low loss transitions typically cannot be achieved using only silicon tapers.

Described herein are waveguide transition structures that achieve the optical coupling between a III-V compound semiconductor waveguide and a silicon waveguide of a thin-silicon photonic circuit in two stages. In the first stage, light is coupled between the III-V waveguide and a double-layered silicon transition waveguide that includes a lower silicon waveguide formed in a thin lower silicon layer, where the thin-silicon photonic circuit is implemented, and an upper silicon waveguide formed in an upper silicon layer of generally comparable thickness that is separated from the lower silicon layer by a thin dielectric layer. In the second stage, light is coupled from the upper silicon waveguide of the double-layered structure into the lower silicon waveguide. In a region underneath the III-V waveguide, the upper and/or lower silicon waveguide are generally tapered to increase in width (or "taper up") in a direction of light propagation to efficiently couple the light from the III-V waveguide into the double-layered silicon transition waveguide. In a subsequent region in which the optical mode is carried fully in the silicon transition waveguide, the upper silicon waveguide is generally tapered to decrease in width (or "taper down) in the direction of light propagation, down to a width smaller than that of the silicon waveguide of the photonic circuit, to efficiently couple the light out of the upper silicon waveguide and into the lower silicon waveguide.

Beneficially, the double-layered transition waveguide achieves the requisite effective index match for transferring light from III-V to silicon by providing an overall higher thickness locally underneath the III-V waveguide, while retaining the benefits of the thin silicon photonics for the photonic circuit in other regions. As a result, it is possible, for instance, to create thin-silicon photonic circuits with high-speed p-n-junction-based silicon modulators and integrated III-V-based light sources.

Various example embodiments are now illustrated with reference to the accompanying drawings.

Figure 1A:
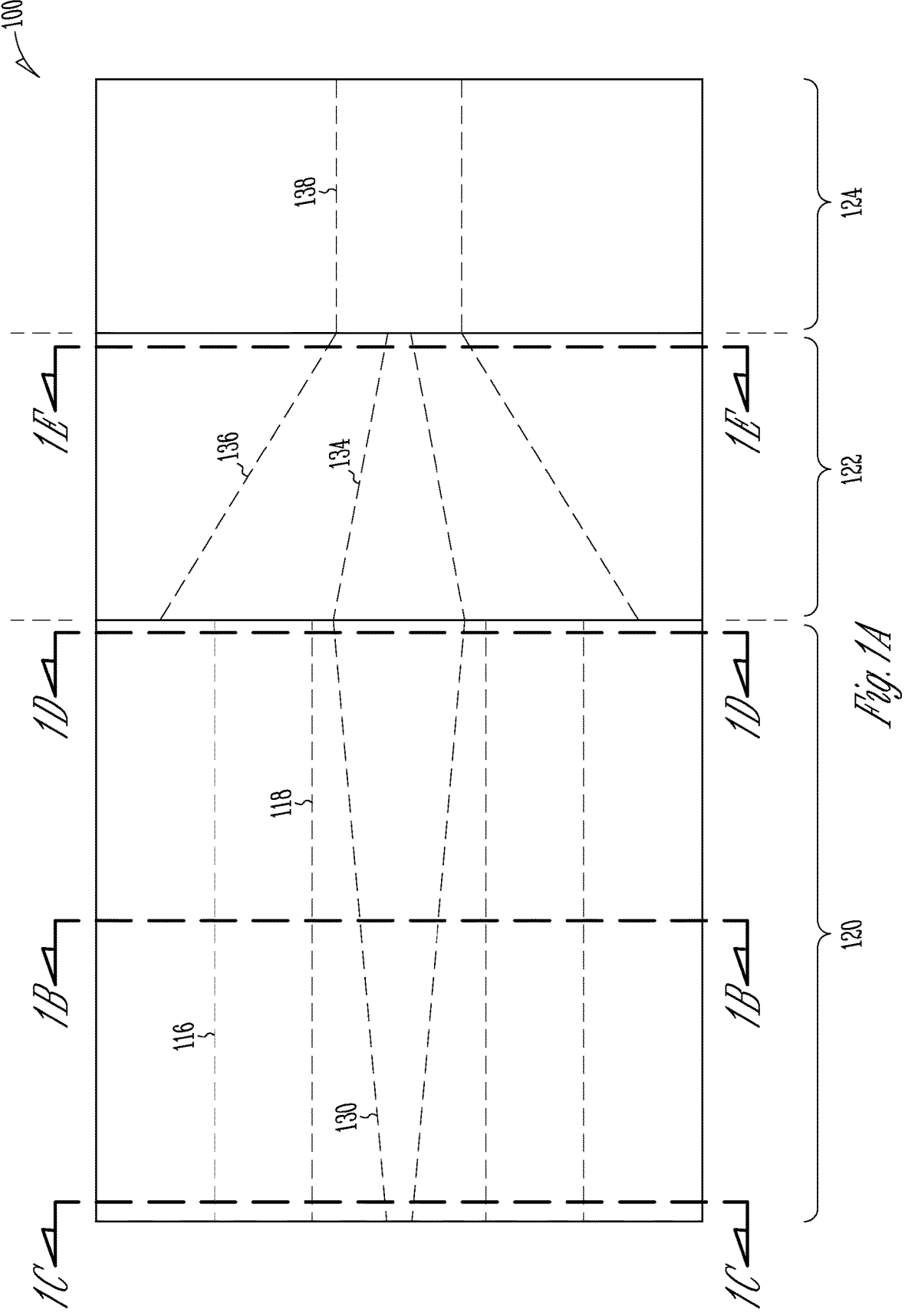
FIGS. 1A and 1B are cross-sectional and top views, respectively, of an example staged waveguide transition structure with a double-layered silicon transition waveguide, in accordance with one embodiment.
Figure 1B:
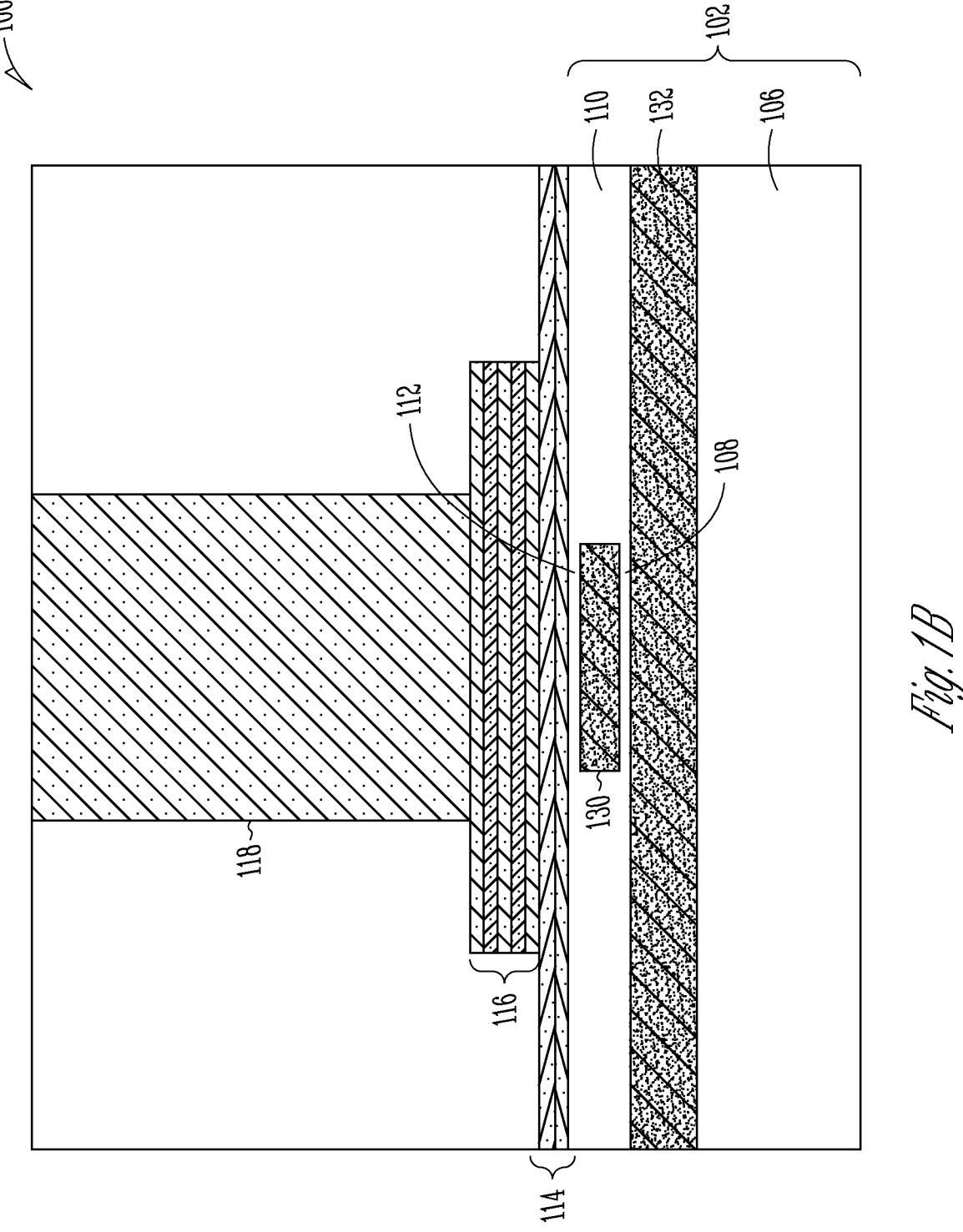

FIGS. 1A and 1B are cross-sectional and top views, respectively, of an example staged waveguide transition structure 100 with a double-layered silicon transition waveguide, in accordance with one embodiment. The silicon transition waveguide is formed in a substrate 102 that includes a thin lower silicon layer disposed on top of an insulator layer 106, and a thin upper second silicon layer separated from the lower silicon layer by a lower dielectric layer 108 (best shown in FIG. 2A). The patterned upper silicon layer is covered by a top dielectric 110, to which a III-V structure is bonded. The lower silicon layer may have a thickness in the range from 100 nm to 300 nm, e.g., a standard thin-silicon thickness of 220 nm. The upper silicon layer may have a comparable thickness, e.g., also in the range from 100 nm to 300 nm. The lower dielectric layer 108 separating the upper and lower silicon layers and the top dielectric layer 112 formed (as part of top dielectric 110) between the upper silicon layer and the III-V structure may each be less than 100 nm thick, and may be made, for example, from silicon oxide ($SiO_2$), silicon nitride ($SiN_x$), or aluminum oxide ($Al_2O_3$). The III-V structure bonded to the substrate 102 may be a mesa-type p-i-n structure including a bottom layer (or stack of layers) 114 of n-type III-V material, a slab of intrinsic (optically active) III-V material layers (referred to as intrinsic layer 116) disposed on top of the n-type bottom layer 114, and a narrower rib of p-type III-V material (referred to as p-type layer 118) disposed on top of the intrinsic layer 116.

As shown in FIG. 1A, the waveguide transition structure includes three consecutive sections—first section 120, second section 122, and third section 124—arranged sequentially along its optical axis (oriented horizontally in the top view of FIG. 1A and perpendicularly to the page in the cross-sectional views of FIGS. 1B-1E). In the first section 120, the upper silicon layer is patterned to form a silicon taper 130 (corresponding to a first segment of the upper silicon waveguide, also referred to herein as a first upper waveguide segment) underneath the III-V structure, whereas the lower silicon layer is uniform and unetched, forming slab 132 (as shown in the cross section through the first section 120 that is depicted in FIG. 1B). The III-V structure therefore overlaps the first upper waveguide segment of the upper silicon layer for at least a portion of the first section 120. The taper 130 increases in width in the direction of propagation from a first width to a second width, e.g., from 0.3 μm or less at the start of the waveguide (first width≤0.3 μm) to 2 μm (or between 1 μm and 3 μm) at the interface of the first section 120 with the second section 122 (second width=2 μm, or 1 μm≤second width≤3 μm). In the second section 122, there is no III-V material above the upper silicon layer, and both the upper silicon layer and the lower silicon layer are tapered down. The taper 134 in the upper silicon layer (which forms the second segment of the upper silicon waveguide, also referred to herein as a second upper waveguide segment) may decrease in width from the second width (e.g., 2 μm) at the interface with the first section 120 to a narrow tip of a third width (e.g., 0.5 μm or less) at the interface with the third section 124, for example. The taper 136 in the lower silicon layer (also referred to herein as a first lower waveguide segment) is formed contiguously with the first lower waveguide segment and is generally wider than the upper taper 134, transitioning from a fifth width (e.g., the width of the slab 132, which is greater than the second width) to a fourth width greater than the third width (e.g., between 0.5 μm and 3 μm). The taper 136 in the lower silicon layer serves to provide a somewhat gradual transition between the uniform slab 132 in the first section and a silicon waveguide (e.g., a rib waveguide) 138 formed in the lower silicon layer in the third section (also referred to herein as a second lower waveguide segment), which has the fourth width. To fully couple light into the silicon (rib) waveguide 138, the tip of the upper taper 134 (having the third width) is generally narrower than the silicon (rib) waveguide 138 (having the fourth width). In the third section 124, there is no III-V material and no upper silicon layer above the lower silicon layer. Thus, the third section 124 is free of the upper silicon layer and the III-V structure; in some embodiments, the second section 122 and/or a portion of the first section 120 may also be free of the III-V structure.

Figure 1C:
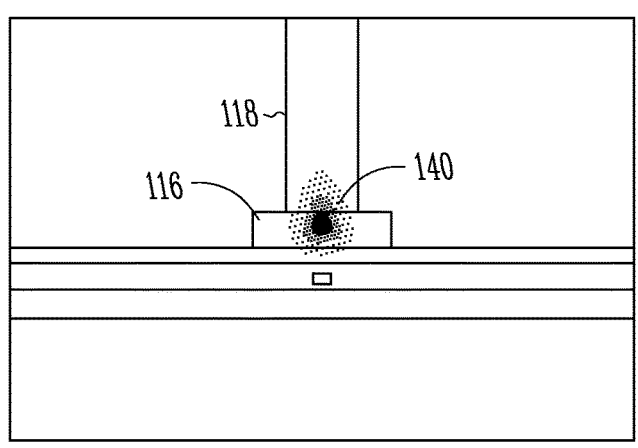
FIGS. 1C-1E are illustrations of the optical mode in cross sections of the staged waveguide transition structure of FIGS. 1A and 1B at various locations along the double-layered silicon transition waveguide.
Figure 1D:
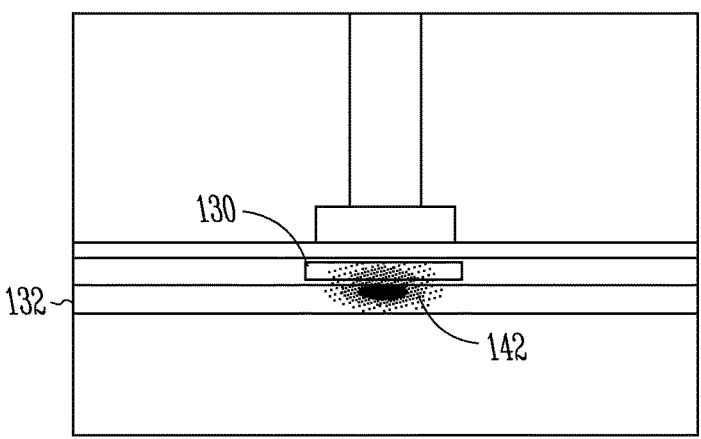
Figure 1E:
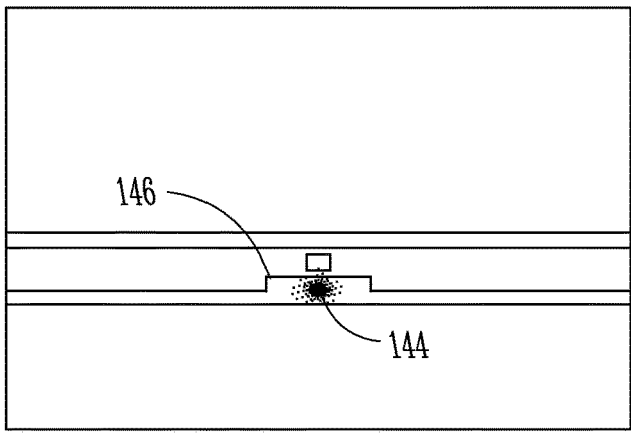

FIGS. 1C-1E are illustrations of the optical mode in cross sections of the staged waveguide transition structure of FIGS. 1A and 1B at various locations along the double-layered silicon transition waveguide. As can be seen, at the beginning of the first section 120, the optical mode 140 is concentrated in the intrinsic layer 116 and p-type layer 118 of the III-V structure. By the end of the first section 120, i.e., the interface with the second section 122, the optical mode 142 has transitioned into the double-layer transition waveguide (upper taper 130 and lower slab 132). At the end of the second section 122, i.e., the interface with the third section 124, the optical mode 144 is entirely within the silicon rib waveguide 138 formed by a partial etch in the lower silicon layer.

Figure 2A:
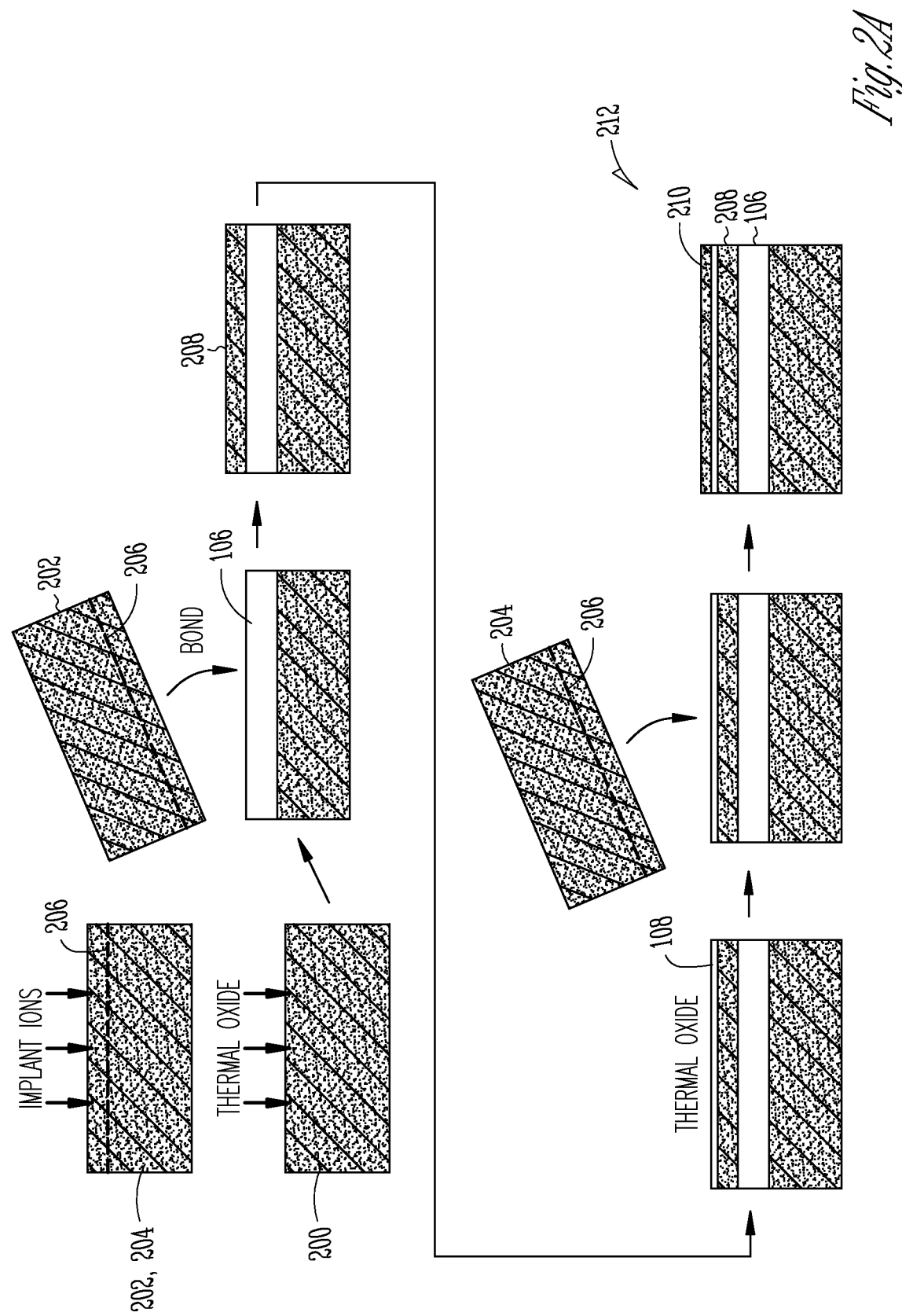
FIGS. 2A-2C show a sequence of cross sections illustrating an example method of manufacturing the staged waveguide transition structure of FIGS. 1A-1E.
Figure 2B:
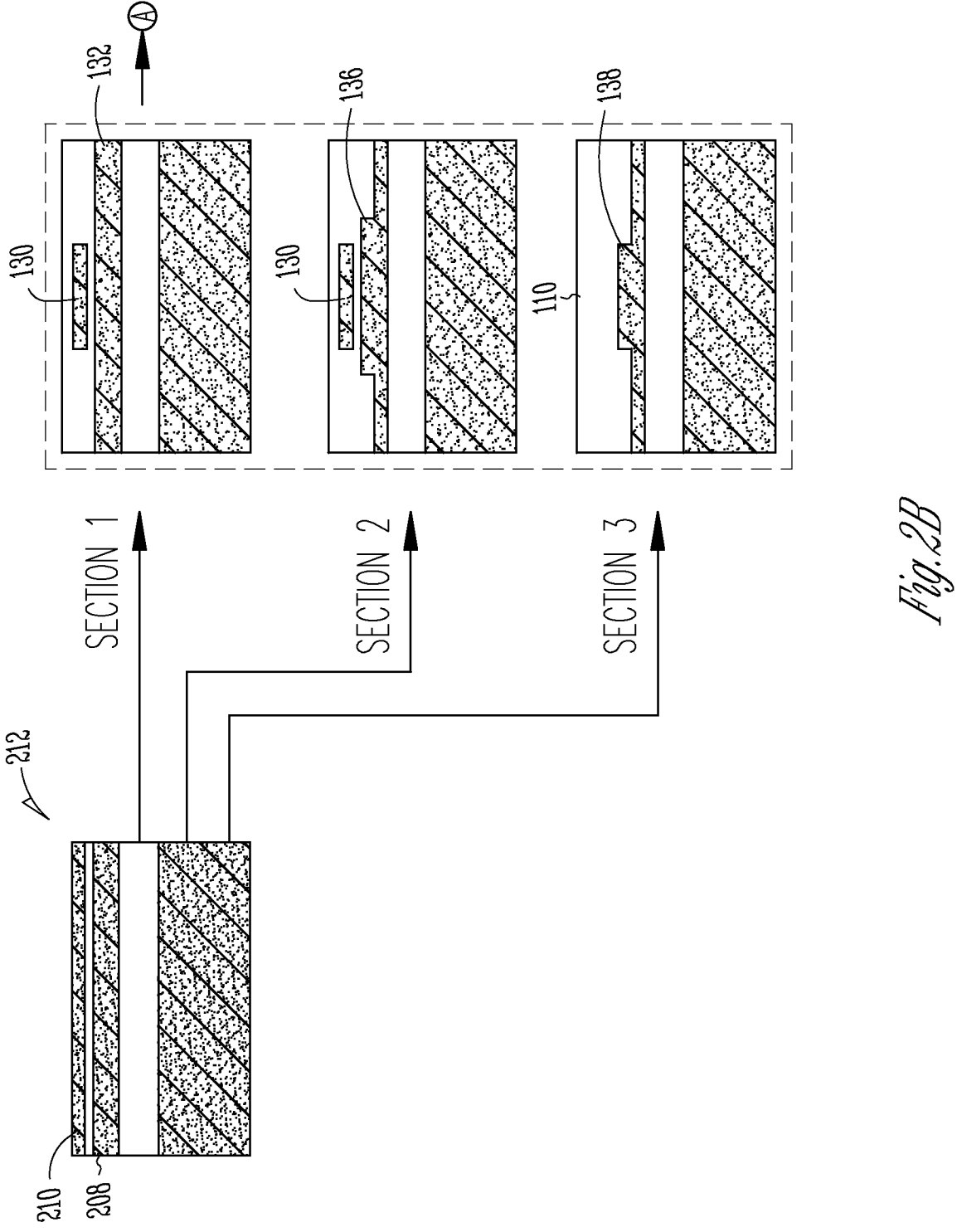
Figure 2C:
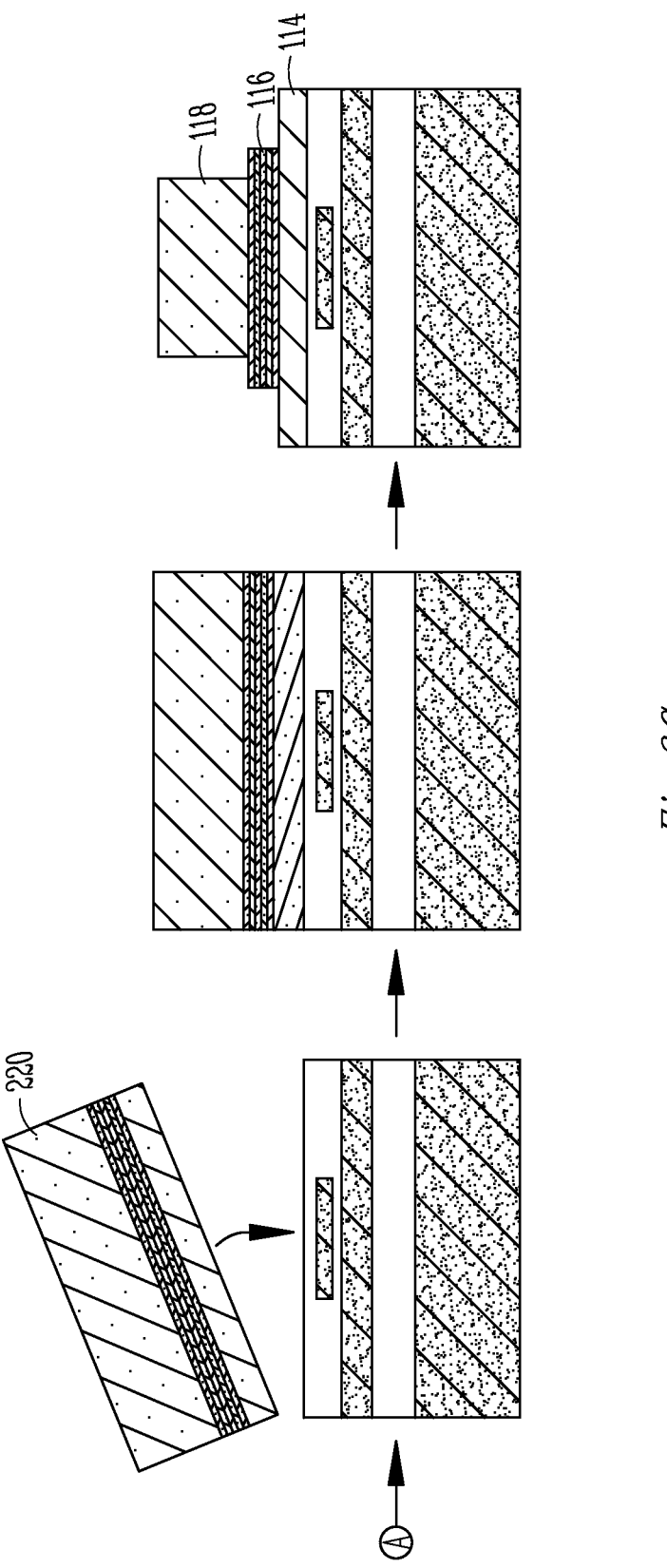

FIGS. 2A-2C show a sequence of cross sections illustrating a method of manufacturing the staged waveguide transition structure of FIGS. 1A-1E. FIG. 2A shows the steps of making the double-layered silicon-on-insulator substrate. First, a silicon wafer 200 is thermally oxidized to form the insulator layer 106. Two additional silicon wafers 202, 204 undergo ion implantation to create an interface 206 at which the wafers 202 or 204 can easily break. The wafer 202 forms, after upside-down bonding to the insulator layer 106 of the first silicon wafer 200 and breaking along the ion-implant interface 206, the lower silicon layer 208. Following thermal oxidation to create the lower dielectric layer 108, the wafer 204 is bonded upside-down to the lower dielectric layer 108 to form, after breaking along the ion-implant interface 206, the upper silicon layer 210 of the double-layered SOI substrate 212. In some embodiments, in one or more additional steps (not shown), germanium is grown on the lower and/or upper silicon layer 208, 210 to allow forming one or more germanium-based photodetectors in the wafer. In some embodiments, in one or more additional steps (not shown), a doped p-n junction is formed with the lower silicon layer 210 to form an optical modulator.

FIG. 2B illustrates the subsequent patterning of the upper and lower silicon layers 210, 208. The upper silicon layer 210 is patterned and etched to create the tapers 130, 134 (the first and second upper waveguide segments, respectively) in the first and second sections 120, 122, and then the lower silicon layer 208 is patterned and partially etched to create the (rib waveguide) taper 136 in the second section and the silicon rib waveguide 138 in the third section (the first and second lower waveguide segments, respectively). Beneficially, the thin lower dielectric layer 108 separating the upper and lower silicon layers 210, 208 allows fully removing the upper silicon from regions where it is not needed for the waveguide transition, without affecting the smooth upper surface of the lower silicon layer 208. The etched regions are filled with top dielectric 110 and planarized (e.g., using a chemical mechanical planarization process (CMP)). Finally, as illustrated in FIG. 2C, a layered III-V die 220 is bonded to the top dielectric 110 of the patterned substrate 212, thinned, and etched to form the III-V structure including the n-type layer 114, intrinsic layer 116, and p-type layer 118, and electrodes (not shown) are formed.

Figure 3:
FIG. 3 is a top view of a staged waveguide transition structure, illustrating a III-V waveguide diverging from an optical axis of the silicon transition waveguide, in accordance with one embodiment.

FIG. 3 is a top view of a staged waveguide transition structure, illustrating a III-V waveguide diverging from an optical axis of the silicon transition waveguide, in accordance with one embodiment. In this example, the waveguide transition structure 100 as shown in FIGS. 1A-1E is modified to further include in the first section 120, between the silicon taper 130 in the upper silicon layer and the interface with the second section 122, a sub-section 300 in which the width of the upper silicon waveguide 302 remains constant, and the III-V waveguide (indicated by intrinsic layer 116 and p-type layer 118), instead of abruptly ending, curves away from the upper silicon waveguide 302 to separate the III-V and silicon structures. The III-V waveguide may go to an optical absorbing region or light trapping structure 304 designed to prevent back reflections.

The structure shown in FIG. 3 may be effective in some cases to reduce back reflection from the termination of the III-V waveguide. Instead of terminating abruptly in the first section 120 or at the interface between the first section 120 and the second section 122, thereby potentially giving rise to back reflections, the III-V waveguide instead curves gradually away toward a light trapping structure 304, such as the multi-sided star structure shown in FIG. 3, used to trap and scatter light to further reduce back reflection. The curve of the III-V waveguide away from the silicon waveguides may be at an angle such that there is no coupling between the III-V waveguide and the silicon waveguides. In some embodiments, the silicon waveguides could be curved instead of the III-V waveguide, in order to angle the silicon waveguides away from the III-V waveguide and thereby decouple the silicon waveguides from the III-V waveguide while reducing back reflections.

Figure 4A:
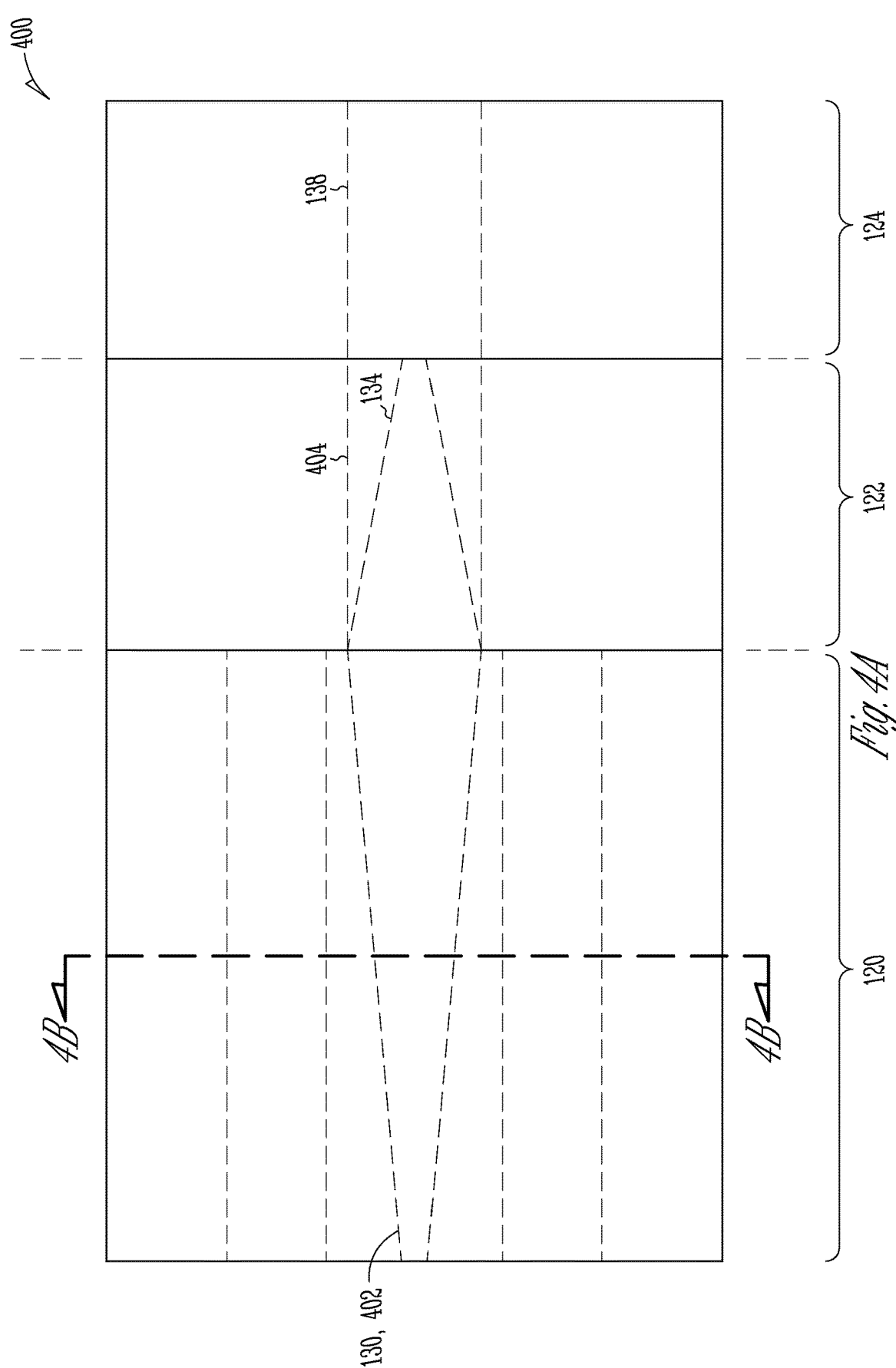
FIGS. 4A and 4B are cross-sectional and top views, respectively, of a staged waveguide transition structure with a double-layered silicon transition waveguide, in accordance with another embodiment.
Figure 4B:
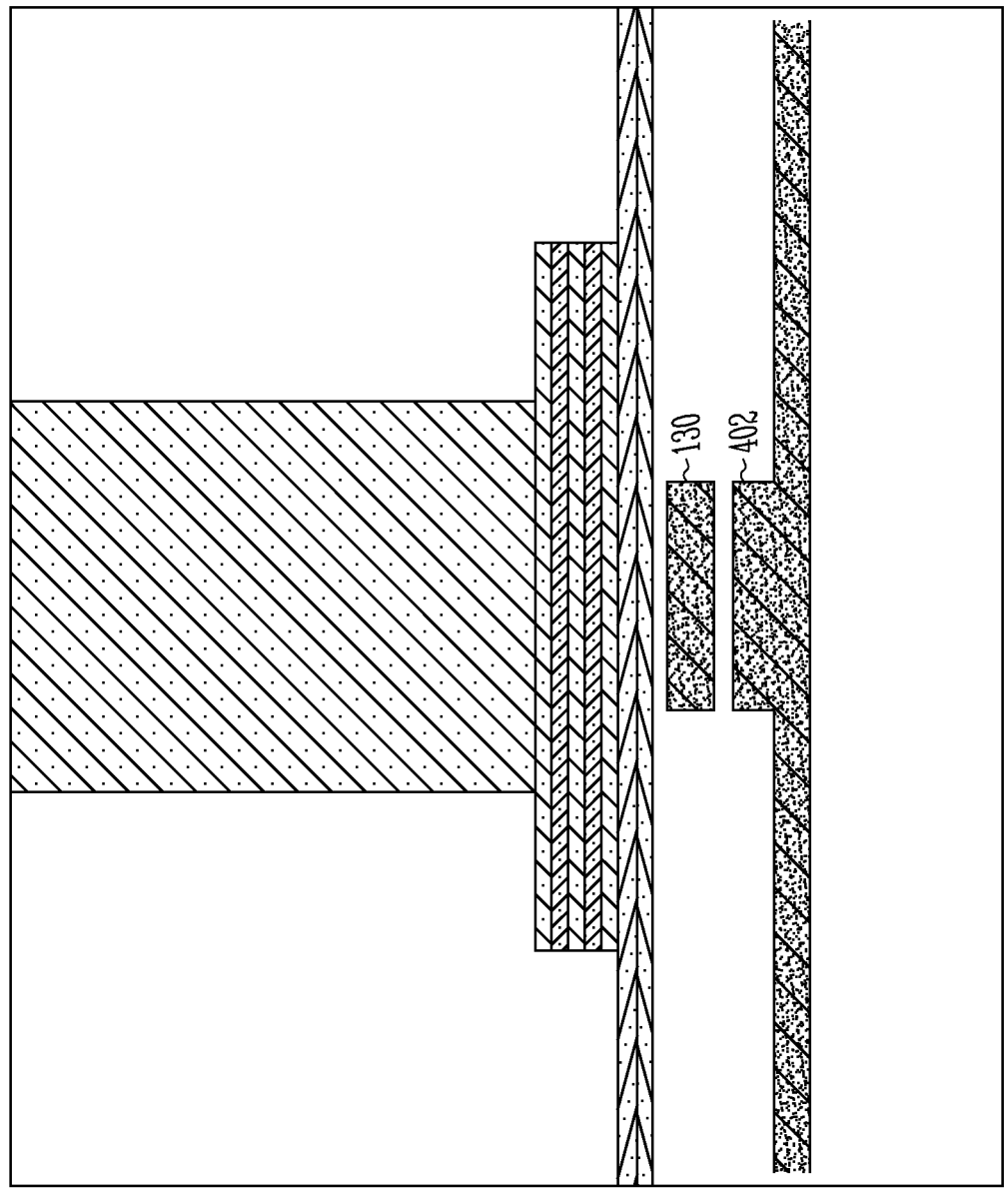

FIGS. 4A and 4B are cross-sectional and top views, respectively, of an example staged waveguide transition structure 400 with a double-layered silicon transition waveguide, in accordance with an alternative embodiment. Here, both upper and lower silicon layers 210, 208 are patterned in the first section 120 to form respective coextensive waveguide tapers 130, 402 that increase in width, e.g., to the width of the rib waveguide 138 in the third section 124. (The waveguide taper 402 formed in the lower silicon layer in the first section 120 is also referred to herein as the third lower waveguide segment.) In the second section 122, the waveguide segment 404 in the lower waveguide (the first lower waveguide segment) has, in this embodiment, constant width. As will be readily understood, this configuration can also be used in conjunction with the sub-section 300 described in FIG. 3 to gradually move the III-V waveguide away from the upper silicon waveguide 302.

Various modifications and changes may be made to the above-described embodiments without departing from the broader scope of the inventive subject matter. Accordingly, the specification and drawings are to be regarded in an illustrative rather than a restrictive sense. Examples described herein may provide devices having waveguide transition structures that achieve the optical coupling between a III-V compound semiconductor waveguide and a silicon waveguide of a thin-silicon photonic circuit in two stages, and methods of manufacture thereof.

In view of the disclosure above, various examples are set forth below. It should be noted that one or more features of an example, taken in isolation or combination, should be considered within the disclosure of this application.

Example 1 is a device comprising: a substrate comprising lower and upper silicon layers separated by a lower dielectric layer; a III-V structure bonded to the substrate; and formed in the substrate and the III-V structure, a waveguide transition structure comprising first, second, and third sections along an optical axis, wherein: the first section comprises a first upper waveguide segment formed in the upper silicon layer, the first upper waveguide segment increasing in width from a first width to a second width at an interface between the first and second sections, the III-V structure overlapping with the first upper waveguide segment; the second section comprises a second upper waveguide segment formed in the upper silicon layer and a first lower waveguide segment formed in the lower silicon layer, the second upper waveguide segment decreasing in width from the second width at the interface between the first and second sections to a third width at an interface between the second and third sections, the first lower waveguide segment having a fourth width at the interface between the second and third sections that is greater than the third width; and the third section comprises a second lower waveguide segment having the fourth width, formed in the lower silicon layer contiguously with the first lower waveguide segment.

In Example 2, the subject matter of Example 1 includes, wherein the first section further comprises a slab in the lower silicon layer, and wherein the first lower waveguide segment decreases in width from a fifth width at the interface between the first and second sections to the fourth width at the interface between the second and third sections, the fifth width being greater than the second width.

In Example 3, the subject matter of Examples 1-2 includes, wherein the first section further comprises a third lower waveguide segment that increases in width from the first width to the second width at the interface between the first and second sections, and wherein the first lower waveguide segment has the fourth width.

In Example 4, the subject matter of Examples 1-3 includes, a top dielectric layer separating the III-V structure from the upper silicon layer.

In Example 5, the subject matter of Example 4 includes, wherein the top dielectric layer has a thickness less than 100 nm.

In Example 6, the subject matter of Examples 1-5 includes, wherein the lower silicon layer and upper silicon layer each have a thickness between 100 nm and 300 nm.

In Example 7, the subject matter of Examples 1-6 includes, wherein the III-V structure includes a curved portion angled away from the optical axis, the curved portion decoupling the III-V structure from the upper silicon layer in at least a portion of the second section.

In Example 8, the subject matter of Example 7 includes, wherein the curved portion of the III-V structure terminates in a light trapping structure.

In Example 9, the subject matter of Examples 6-8 includes, wherein the lower silicon layer comprises an optical modulator comprising a doped p-n junction.

In Example 10, the subject matter of Examples 1-9 includes, germanium formed on at least one of the lower silicon layer or the upper silicon layer; and one or more photodetectors comprising the germanium and the at least one of the lower silicon layer or the upper silicon layer.

In Example 11, the subject matter of Examples 1-10 includes, wherein the first width of the first upper waveguide segment is 0.3 μm, and the second width of the first upper waveguide segment is 2 μm.

In Example 12, the subject matter of Examples 1-11 includes, wherein the third width of the second upper waveguide segment is 0.5 μm or less.

In Example 13, the subject matter of Examples 1-12 includes, wherein the fourth width of the second lower waveguide segment is between 0.5 μm and 3 μm.

In Example 14, the subject matter of Examples 1-13 includes, wherein the third section is free of the upper silicon layer and the III-V structure.

In Example 15, the subject matter of Examples 1-14 includes, wherein the III-V structure comprises a mesa-type p-i-n structure.

In Example 16, the subject matter of Example 15 includes, wherein the mesa-type p-i-n structure comprises: a bottom layer of n-type III-V material; a slab of optically active III-V material disposed above the bottom layer; and a rib of p-type III-V material disposed above the slab, the rib of p-type III-V material being narrower than the slab of optically active III-V material.

Example 17 is a method of manufacturing a photonic device, the method comprising: providing a substrate comprising a lower silicon layer disposed on an insulating layer, the substrate comprising a first section, second section, and third section arranged sequentially along an optical axis of the photonic device; forming an upper silicon layer over the lower silicon layer in the first and second sections with a lower dielectric layer separating the upper and lower silicon layers; patterning the upper silicon layer to form: a first upper waveguide segment in the first section, the first upper waveguide segment increasing in width from a first width to a second width at an interface between the first and second sections; and a second upper waveguide segment in the second section, the second upper waveguide segment decreasing in width from the second width at the interface between the first and second sections to a third width at an interface between the second and third sections; patterning the lower silicon layer to form: a first lower waveguide segment in the second section having a fourth width at the interface between the second and third sections that is greater than the third width; and a second lower waveguide segment in the third section having the fourth width, formed in the lower silicon layer contiguously with the first lower waveguide segment; forming a top dielectric layer above the upper silicon layer; bonding a III-V semiconductor structure to the top dielectric layer in the first section; and patterning the III-V semiconductor structure to form a III-V waveguide overlapping the first upper waveguide segment in the first section.

In Example 18, the subject matter of Example 17 includes, patterning the lower silicon layer to form a slab in the lower silicon layer in the first section; wherein the first lower waveguide segment decreases in width from a fifth width at the interface between the first and second sections to the fourth width at the interface between the second and third sections, the fifth width being greater than the second width.

In Example 19, the subject matter of Examples 17-18 includes, patterning the lower silicon layer to form a third lower waveguide segment in the first section that increases in width from the first width to the second width at the interface between the first and second sections; wherein the first lower waveguide segment has the fourth width.

In Example 20, the subject matter of Examples 17-19 includes, forming germanium on at least one of the lower silicon layer or the upper silicon layer; and forming one or more photodetectors comprising the germanium.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A device comprising:
a substrate comprising lower and upper silicon layers separated by a lower dielectric layer;
a III-V structure bonded to the substrate; and
formed in the substrate and the III-V structure, a waveguide transition structure comprising first, second, and third sections along an optical axis, wherein:
the first section comprises a first upper waveguide segment formed in the upper silicon layer, the first upper waveguide segment increasing in width from a first width to a second width at an interface between the first and second sections, the III-V structure overlapping with the first upper waveguide segment;
the second section comprises a second upper waveguide segment formed in the upper silicon layer and a first lower waveguide segment formed in the lower silicon layer, the second upper waveguide segment decreasing in width from the second width at the interface between the first and second sections to a third width at an interface between the second and third sections, the first lower waveguide segment decreasing in width from a fifth width at the interface between the first and second sections to a fourth width at the interface between the second and third sections, the fifth width being greater than the second width, the fourth width being greater than the third width; and
the third section comprises a second lower waveguide segment having the fourth width, formed in the lower silicon layer contiguously with the first lower waveguide segment.

2. The device of claim 1, wherein the first section further comprises a slab in the lower silicon layer.

3. The device of claim 1, wherein the first section further comprises a third lower waveguide segment that increases in width from the first width to the second width at the interface between the first and second sections, and wherein the first lower waveguide segment has the fourth width.

4. The device of claim 1, further comprising a top dielectric layer separating the III-V structure from the upper silicon layer.

5. The device of claim 4, wherein the top dielectric layer has a thickness less than 100 nm.

6. The device of claim 1, wherein the lower silicon layer and upper silicon layer each have a thickness between 100 nm and 300 nm.

7. The device of claim 1, wherein the III-V structure includes a curved portion angled away from the optical axis, the curved portion decoupling the III-V structure from the upper silicon layer in at least a portion of the second section.

8. The device of claim 7, wherein the curved portion of the III-V structure terminates in a light trapping structure.

9. The device of claim 6, wherein the lower silicon layer comprises an optical modulator comprising a doped p-n junction.

10. The device of claim 1, further comprising:
germanium formed on at least one of the lower silicon layer or the upper silicon layer; and
one or more photodetectors comprising the germanium and the at least one of the lower silicon layer or the upper silicon layer.

11. The device of claim 1, wherein the first width of the first upper waveguide segment is 0.3 μm or less, and the second width of the first upper waveguide segment is between 1 μm and 3 μm.

12. The device of claim 1, wherein the third width of the second upper waveguide segment is 0.5 μm or less.

13. The device of claim 1, wherein the fourth width of the second lower waveguide segment is between 0.5 μm and 3 μm.

14. The device of claim 1, wherein the third section is free of the upper silicon layer and the III-V structure.

15. The device of claim 1, wherein the III-V structure comprises a mesa-type p-i-n structure.

16. The device of claim 15, wherein the mesa-type p-i-n structure comprises:
a bottom layer of n-type III-V material;
a slab of optically active III-V material disposed above the bottom layer; and
a rib of p-type III-V material disposed above the slab, the rib of p-type III-V material being narrower than the slab of optically active III-V material.

17. A method of manufacturing a photonic device, the method comprising:

providing a substrate comprising a lower silicon layer disposed on an insulating layer, the substrate comprising a first section, second section, and third section arranged sequentially along an optical axis of the photonic device;

forming an upper silicon layer over the lower silicon layer in the first and second sections with a lower dielectric layer separating the upper and lower silicon layers;

patterning the upper silicon layer to form:

a first upper waveguide segment in the first section, the first upper waveguide segment increasing in width from a first width to a second width at an interface between the first and second sections; and a second upper waveguide segment in the second section, the second upper waveguide segment decreasing in width from the second width at the interface between the first and second sections to a third width at an interface between the second and third sections;

patterning the lower silicon layer to form:

a first lower waveguide segment in the second section decreasing in width from a fifth width at the interface between the first and second sections to a fourth width at the interface between the second and third sections, the fifth width being greater than the second width, the fourth width being greater than the third width; and a second lower waveguide segment in the third section having the fourth width, formed in the lower silicon layer contiguously with the first lower waveguide segment;

forming a top dielectric layer above the upper silicon layer;

bonding a III-V semiconductor structure to the top dielectric layer in the first section; and patterning the III-V semiconductor structure to form a III-V waveguide overlapping the first upper waveguide segment in the first section.

18. The method of claim 17, further comprising patterning the lower silicon layer to form a slab in the lower silicon layer in the first section.

19. The method of claim 17, further comprising patterning the lower silicon layer to form a third lower waveguide segment in the first section that increases in width from the first width to the second width at the interface between the first and second sections;

wherein the first lower waveguide segment has the fourth width.

20. The method of claim 17, further comprising:

forming germanium on at least one of the lower silicon layer or the upper silicon layer; and forming one or more photodetectors comprising the germanium.

* * * * *